J. R. MEINERS.
NUT LOCK.
APPLICATION FILED JULY 13, 1910.
996,725.
Patented July 4, 1911.
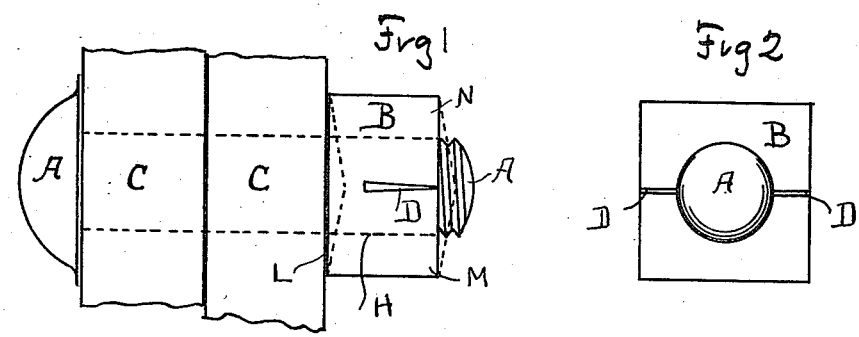
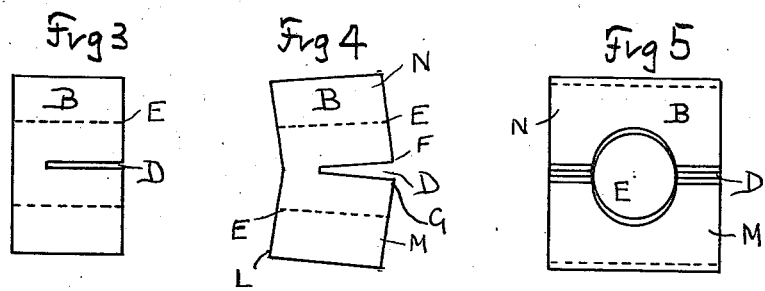
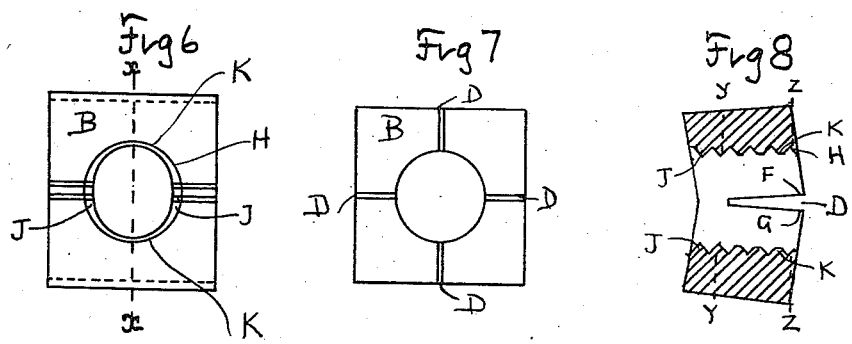
Witnesses:
Andrew Greis
John Greis.
Inventor
John R. Meiners

UNITED STATES PATENT OFFICE.

JOHN R. MEINERS, OF NEW YORK. N. Y.

NUT-LOCK.

996,725. Specification of Letters Patent. Patented July 4, 1911.

Application filed July 13, 1910. Serial No. 571,729.

*To all whom it may concern:*

Be it known that I, JOHN R. MEINERS, citizen of the United States, and resident of New York, in the county of New York and State of New York, have invented certain new and useful Improvements in Nut-Locks, of which the following is a specification.

My invention relates to nut locks and the object is to produce a nut having its threads so formed as to be self-locking on the bolt.

Figure 1: is a side view of a nut and bolt showing my improvement. Fig. 2: is an end view of the bolt showing the nut thereon. Fig. 3: is a detached side view of the nut before expanded and tapped. Fig. 4: is another detached view of the nut showing it expanded. Fig. 5: is a front view of the nut as shown in Fig. 4. Fig. 6: is another front view of the nut expanded showing the threads cut in same. Fig. 7: is another front view of the nut, showing a modification. Fig. 8: is a section on line XX, Fig. 6.

A is the bolt of usual construction, B is the nut adapted to be screwed on said bolt. C are the backing pieces.

The nut B is of any shape or size and of any metal, preferably steel, and if of steel may be tempered. The nut has a bore E and a kerf D, cut across the face thereof to a certain depth (see Figs. 1—3—4). This kerf facilitates the bending of the nut, as shown in Figs. 4—8, for the purpose of spreading the bore E at points F and G, thereby causing the said bore to be oblong or elliptical in order that when the nut is tapped the threads H will be cut deeper at J J than at K K, that is the valleys of the nut threads will be of full depth in the nut opposite the expanded portion and of less depth at the expanded portion, thereby causing the ridges of the nut threads to be elliptical, and the valleys to be a true circle. These oblong threads do not hinder the applying of the nut on the bolt, for the condition of the threads enables the nut to be readily screwed on the bolt by hand until it reaches the backing C because the valleys of the nut threads engage only the ridges of the bolt threads and thereby lessen the frictional engagement between the coöperative members. It will, therefore, be seen that the bolt threads and likewise nut threads are not injured at all when the nut is first screwed on the bolt, which is an important factor. This oblong condition of the threads, also facilitates the removal of the nut from the bolt; that is, when you unscrew the nut it will spring back and readily cause the jaws M N to open up outwardly thus allowing the nut to easily and harmlessly pass off the bolt. The nut thus formed is placed on the bolt A, see Fig. 1, and then forcibly screwed up against the plates or backing C, until the back portion of the nut is straightened as shown in Fig. 1. This straightening out of the back L of the nut tends to force together the jaws M N on each side of the kerf, which press the shallow portions of the threads K K or kerf threads, (as tapped between the dotted lines Y Z, see Fig. 8), of the nut upon the bolt thread and cause the said shallow portion of the threads K K of the nut to grip the bolt, at the same time the portion of the threads J J being cut full or of regular depth has no other function to perform than guiding the nut on the threads of the bolt when being applied thereto. Now when the shallow portions of the threads K K of the nut are pressed upon the ridges of the bolt threads by forcibly screwing the said nut against the backing C it will cause a frictional engagement between the bolt threads and the shallow portions of the nut threads, thereby preventing the nut of itself from turning back on the bolt.

I am aware that the principle of this invention remains the same if only one of the jaws is bent. In case only one jaw is bent outward, the valleys of the threads in such bent member will only have cut therein shallow threads, while the unbent member will have full or regular threads.

I may cut more than one kerf across the face of the nut, see Fig. 7, and in such case the more kerfs cut at certain angles, the less the threads will be oblong, but with the same conditions, all the threads will be gradually shallow in circumference in proportion of the angle of spreading; in other words, when two or more kerfs are cut, it will require a concaving instead of a bending thereby causing a conical-shaped bore.

It will be seen that when the kerf in the nut is expanded, as shown in Fig. 4, the wall of the bore E will be on an angle, which will cause the threads H when cut therein to be deep and shallow, as shown at J J and K K. The nut is bent before it is tapped which makes the bottom of the threads oblong when cut therein.

What I claim is—

1. In a nut lock in combination with a bolt a nut bored, kerfed, bent and tapped; said tapping cutting the threads in the bore of said nut shallow at the bent portion or portions thereof, thereby causing a frictional engagement between the bolt threads and the shallow threads of the nut.

2. In a nut lock a nut bored, kerfed, bent and tapped, said tapping cutting the valleys of the threads of the nut concentric throughout, and the ridges shallow, at the bent part or parts of said nut.

3. In a nut lock, a nut bored, kerfed, bent and threaded, said threads having their valleys cut concentric throughout the nut and their ridges cut elliptical only in the bent portion of the said nut.

4. In a nut lock, a nut kerfed and bent; said nut having a bore decreasing in extent from the top of said nut downward; threads cut in said bore correspondingly shallow or in part shallow in extent proportional to the decrease of said bore.

Signed at New York in the county of New York and State of New York this 9th day of July A. D. 1910.

JOHN R. MEINERS.

Witnesses:
ANDREW GREIS,
JOHN GREIS.